March 22, 1960 R. ZIPPEL 2,929,608
MOTOR-DRIVEN MACHINE FOR THE PURPOSE OF TENSIONING
AND CLOSING A LOOP APPLIED ABOUT A PACKED ARTICLE
Filed Dec. 6, 1955 5 Sheets-Sheet 1
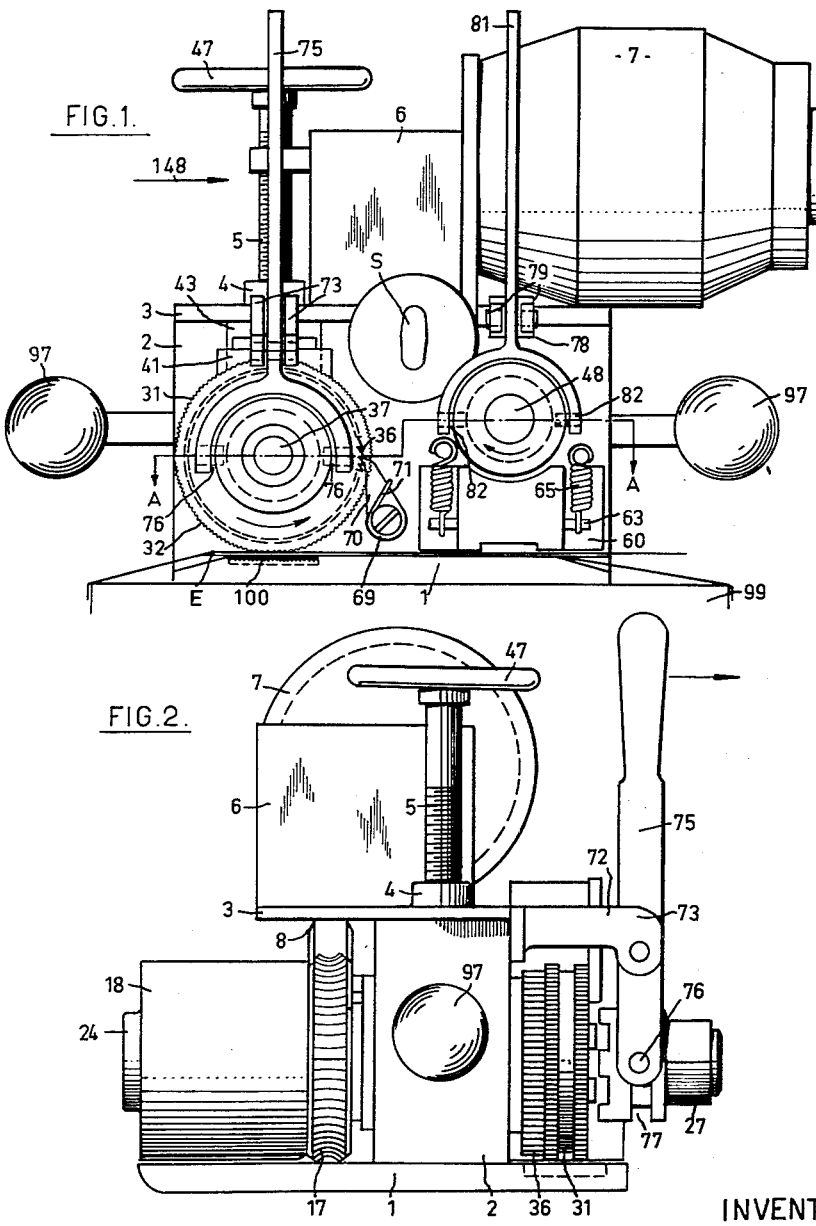
INVENTOR:
RICHARD ZIPPEL
BY

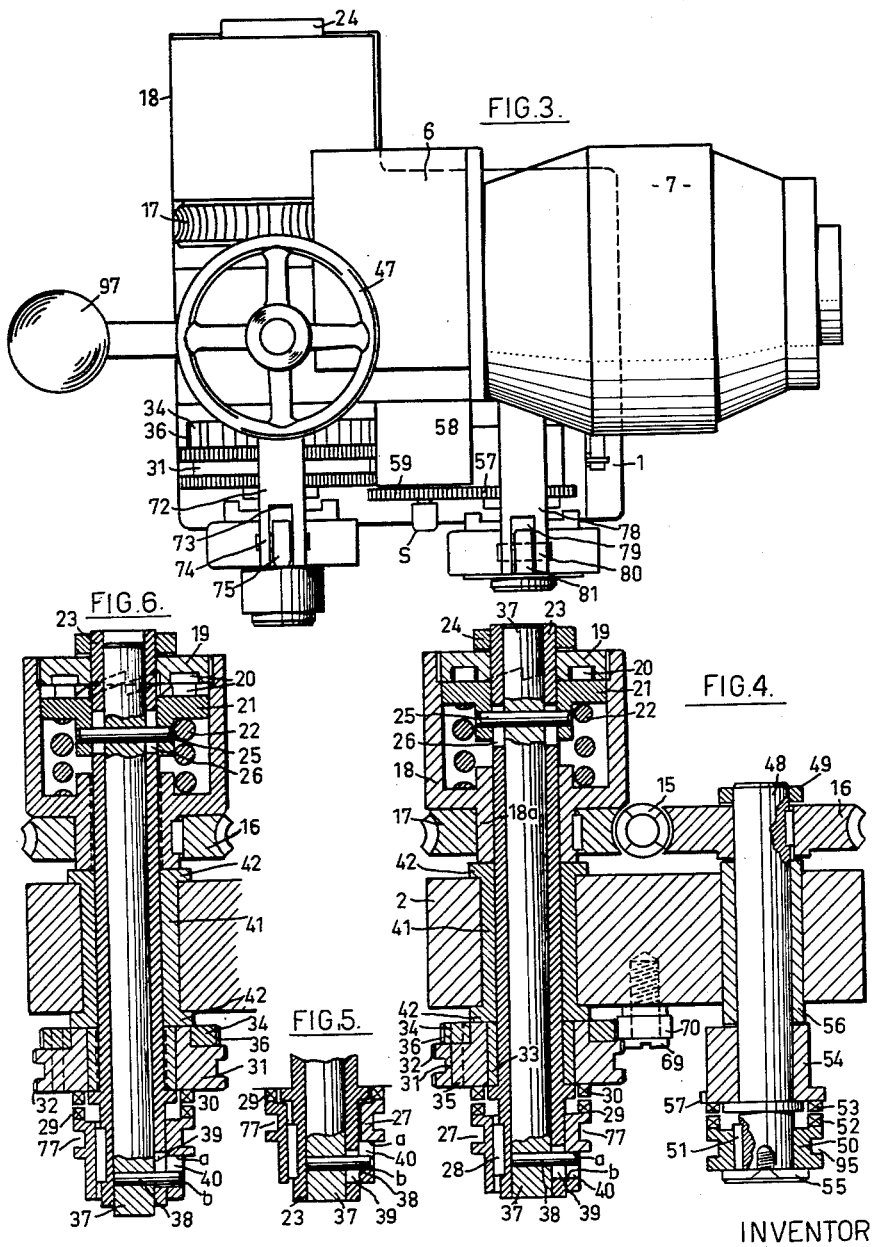

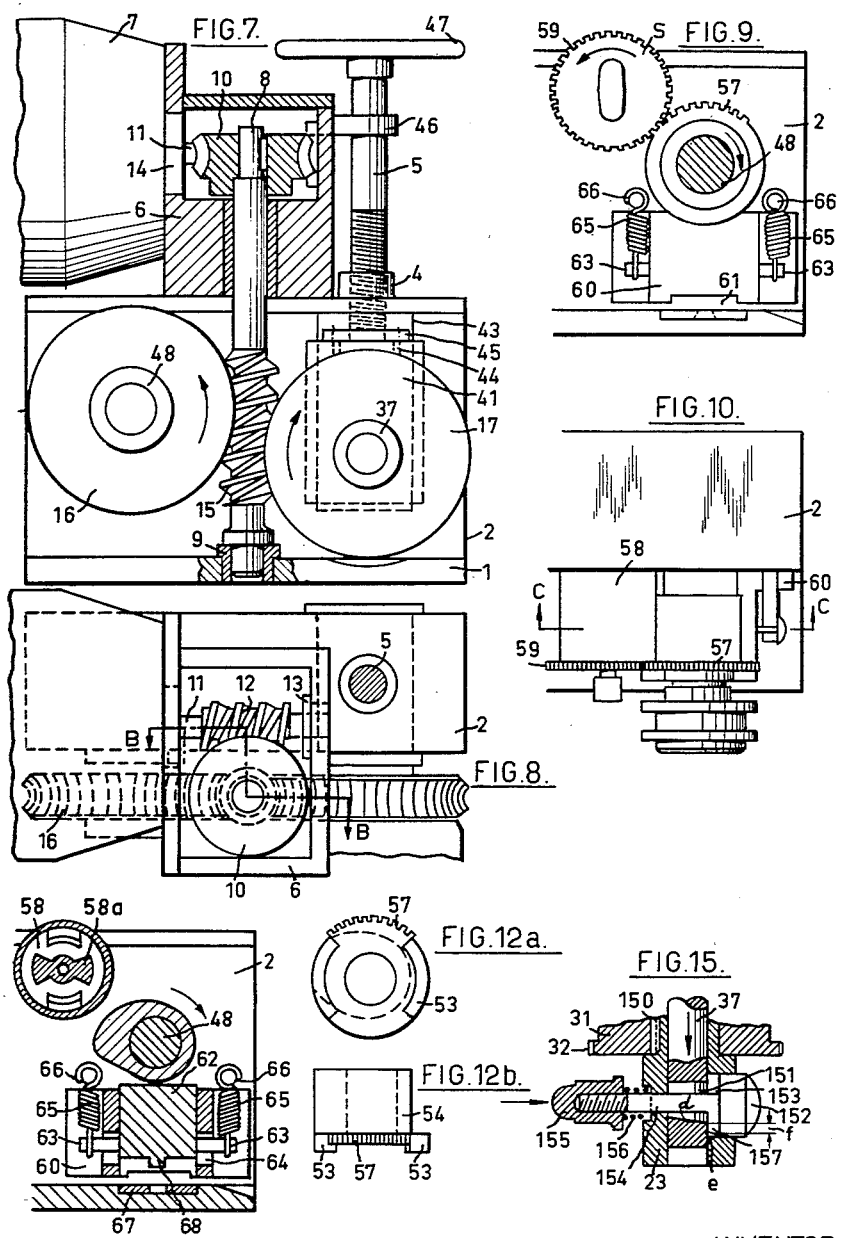

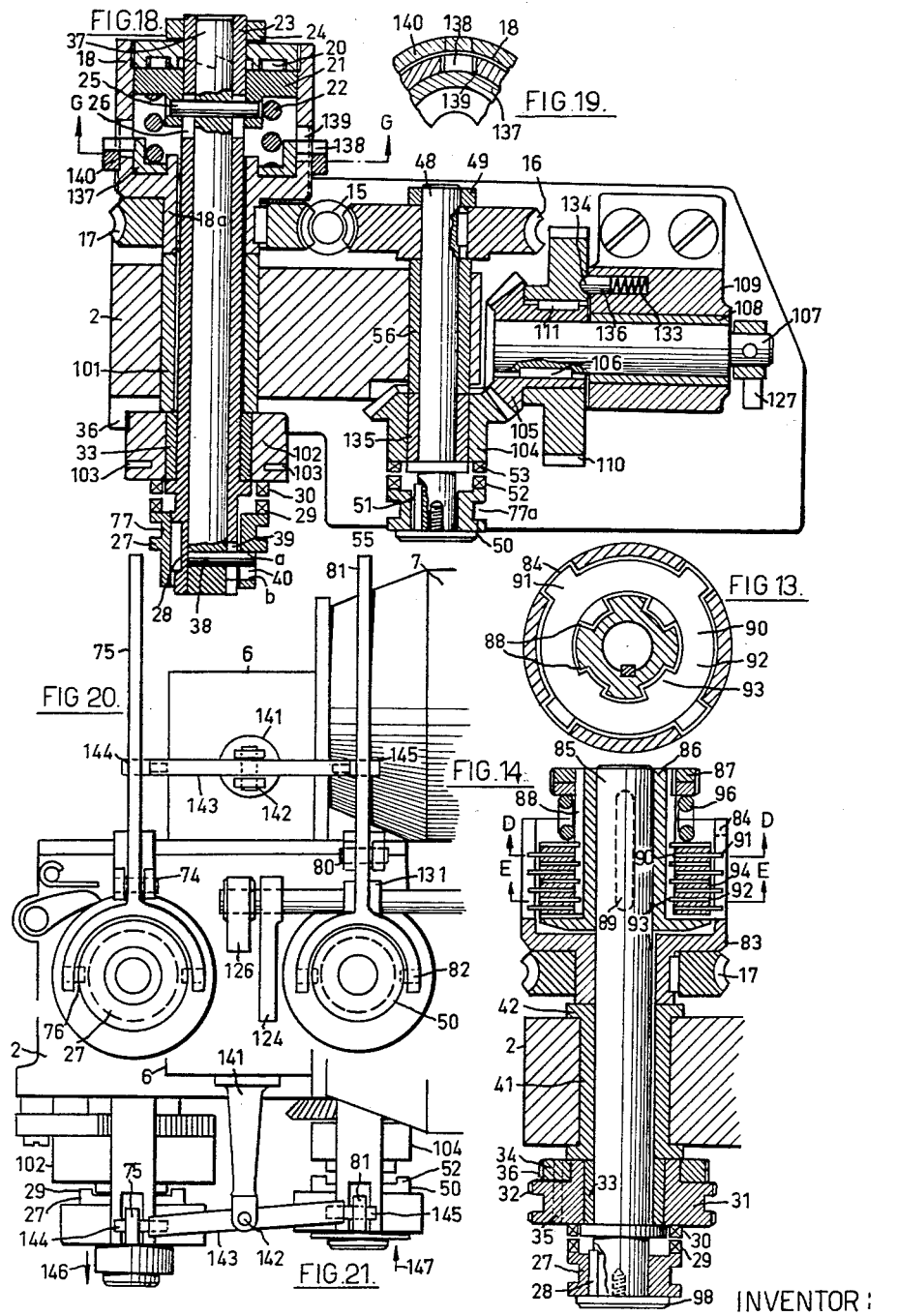

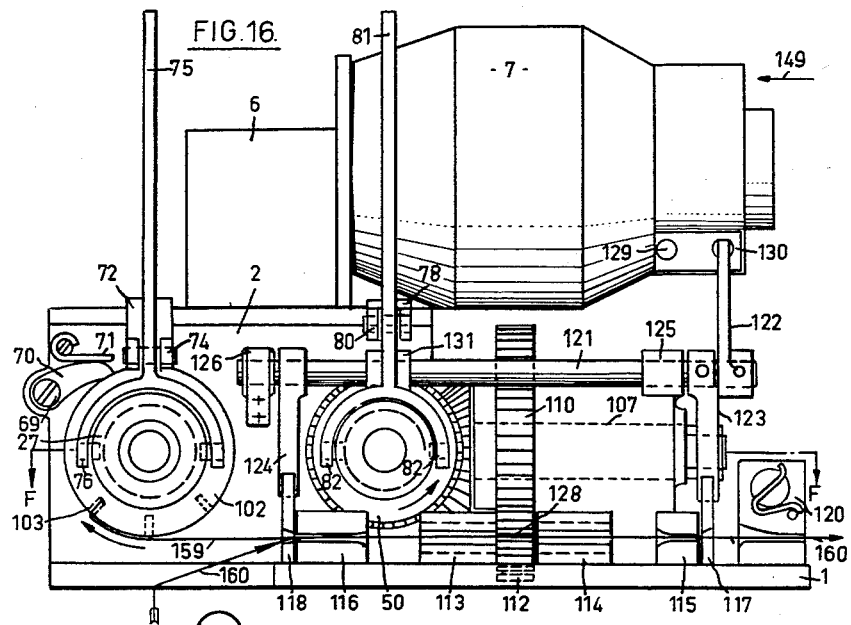
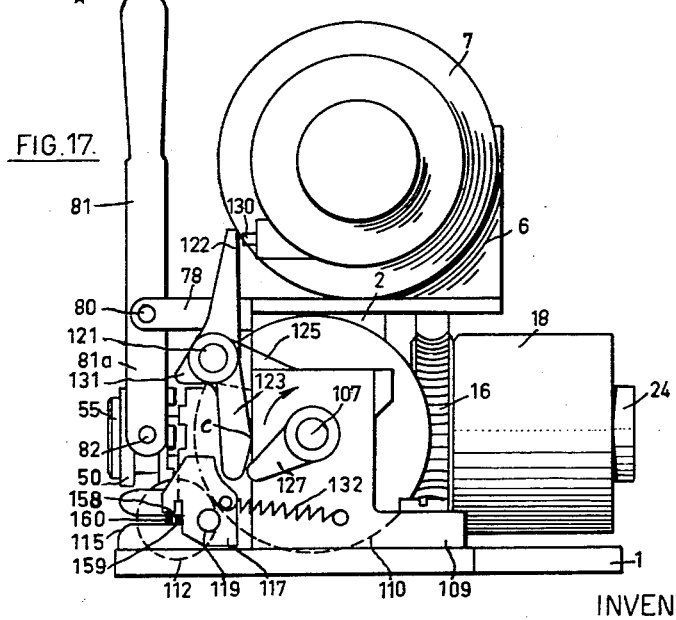

United States Patent Office 2,929,608
Patented Mar. 22, 1960

2,929,608

MOTOR-DRIVEN MACHINE FOR THE PURPOSE OF TENSIONING AND CLOSING A LOOP APPLIED ABOUT A PACKED ARTICLE

Richard Zippel, Hannover-Linden, Germany, assignor to A.G. fur Technische Neuheiten, Binningen (Baselland, Switzerland), a joint-stock company Application December 6, 1955, Serial No. 551,433

4 Claims. (Cl. 254—51)

This invention relates to a motor-driven machine for the purpose of tensioning and closing a loop applied about a packed article.

It is known to loop wire or strapping round a pack and to close the two ends of the loop together after tensioning the said loop. Both hand-operated and motor-driven machines are known for tensioning and closing. The hand-operated machines are easy to transport and have hand levers or hand cranks for operating the devices for tensioning and closing the wire or banding. Operators have to apply considerable force in order to actuate these machines, and over a period of time they strain and tire the worker, especially in the case of packs which required movement over a relatively long distance for tensioning the loop, e.g. packs with very yieldable contents. In these cases the loops often have to be subsequently tightened several times, and this takes up a good deal of time. In addition, it is not always possible with these machines to tension the wire or strapping uniformly, since the tension obtained in a particular case depends on the force which the operator happens to apply. But the overtensioning of the wire or strapping which this causes is undesirable, since it is generally the cause of the wire or the strapping bursting during transport or when the pack is dropped.

Among motor-driven machines, a readily transportable wire-tensioning machine is known, but it has only a limited tensioning distance. It is provided with lifting discs and tensioning arms, and automatically accomplishes the transition from the tensioning operation to the twisting of the wire ends directly after the tensioning operation. This machine has the disadvantage that the limited tensioning distance over which the wire arranged about the pack is tensioned is insufficient in the case of large packs, and particularly with yieldable packs, to give the binding wire the requisite tension before its ends are twisted.

It is true that other motor-driven machines for tensioning and closing a closure band have devices for adjusting the band tension, but these machines do not permit subsequent tensioning of the band before the closing operation; they also do not permit the tension to be adjusted during the tensioning operation or after it has ended, since the closing operation follows immediately upon the tensioning operation. Consequently the particular tension of the band depends on the tension limit which is set in the tensioning device, the tensioning operation is automatically interrupted after the said limit is exceeded, and the closing operation then comes into play. However, the requisite adjustment of the tension cannot always be accurately judged before the loops is tensioned. Consequently work carried out with these machines is not always satisfactory.

An object of the invention is to construct a motor-driven machine of this kind in such a way that the tension of the loop can be adjusted even after completion of the tensioning operation and before commencement of the closing operation. The invention provides a motor-driven machine for tensioning and closing a loop applied about a pack, the said machine comprising a tensioning device which is adapted to tighten the loop and is driven by way of a slipping clutch, and a closing device which is driven from the same motor and is adapted to connect together the loop ends, the tensioning device being automatically stopped when the loop tension exceeds a value determined by the force-transmitting capacity of the slipping clutch, wherein the tensioning device and the closing device are each driven by way of a control clutch.

The slipping clutch can at the same time serve as control clutch for the tensioning device. It can consist e.g. of an electromagnetic coupling whose force-transmitting power can be regulated by means of a variable resistance, the electromagnetic clutch being associated with a switching member in such a manner that it interrupts the supply of current to the clutch in order to slip the said clutch.

The machine provided by the invention combines the advantages of the hitherto known motor-driven machines and of the hand-operated machines, wherein the tensioning and closing operations are separated from one another in time, without having the aforesaid disadvantages of these two types of machines. It allows the loop which is arranged about the pack to be tensioned by means of a motor after the conclusion of the tensioning operation controlled by the slipping clutch and before the closing device is brought into operation, since, after the conclusion of the tensioning operation, the machine can first of all run idly before the control clutch for the closing device is operated. The control clutch for the closing device is operated only after the optimum loop tension has been found by subsequent tensioning one or more times. The machine can be so constructed that this control clutch can optionally be operated automatically, so that, in the handling of a number of similar packs, once the correct tension limit for stopping the tensioning operation has been found and set the control clutch for the closing device is automatically controlled for the whole of the subsequent series.

Embodiments of the machine provided by the invention are illustrated in the accompanying drawings, in which:

Figure 1 is a front elevation of a band tensioning and closing machine,

Figure 2 is a side elevation viewed in the direction of the arrow 148 in Figure 1, and Figure 3 is a plan view thereof.

Figure 4 is a cross-sectional view taken on the line A—A of Figure 1 with control clutches disengaged by hand.

Figure 5 is a similar view showing the control clutch of the tensioning device in the engaged condition.

Figure 6 is a similar view showing this control clutch disengaged by the slipping clutch.

Figure 7 is a rear elevation of the driving mechanism, partly in section taken along the line B—B of Figure 8.

Figure 8 is a plan view thereof.

Figure 9 is a similar view to that of Figure 1, showing the part comprising switch, eccentric and closure plunger.

Figure 10 is a plan view thereof.

Figure 11 is a sectional view taken on the line C—C of Figure 10.

Figure 12a is an elevation of the eccentric.

Figure 12b is a plan view thereof.

Figure 13 shows in its upper half a sectional view taken on the line D—D, and in its lower half a sectional view taken on the line E—E, of Figure 14, which is a similar view to that of Figure 4 shows a further embodiment of the slipping clutch part.

Figure 15 is a view similar to Figure 5, and shows another embodiment of the control clutch for the tensioning device.

Figure 16 is a front elevation of a machine for tensioning and twisting wire.

Figure 17 is a side elevation thereof seen in the direction of the arrow 149.

Figure 18 is a sectional view taken on the line F—F of Figure 17.

Figure 19 is a part of a sectional view taken on the line G—G of Figure 18.

Figure 20 shows, in a similar kind of view to Figure 16, an embodiment having change-over means which can be operated automatically or manually as desired.

Figure 21 is a plan view thereof.

The band closing machine shown in Figures 1 to 12 comprises a bed plate 1, as is shown most clearly in Figures 1 and 2. Fixed to this bed plate is a housing 2 covered at the top by a cover plate 3. The latter is formed with a vertical hole into which is inserted a threaded sleeve 4 indicated in Figures 2 and 7. A vertical spindle 5 engages with the said sleeve. Fixed to the cover plate 3 is a gear casing 6 which contains a speed reduction gear driven by a motor 7. As Figure 7 shows, the housing of this motor has a centering pin 14 which is inserted in a corresponding hole in the adjoining wall of the casing 6. The motor shaft 11 is guided centrally through a bearing hole, not shown, in the pin 14. The said shaft is provided, as shown in Figure 8, with a worm 12 and is mounted on the opposite wall of the casing 6 in a sleeve 13. The worm 12 engages with a worm wheel 10 which is keyed onto a vertical shaft 8. As shown in Figure 7, the shaft 8 is rotatably mounted at one end in a journal bearing inserted in the base of the casing 6 and at the other end in a bushing 9 fitted into the bed plate 1. Mounted on the shaft 8 is a worm 15 which meshes with two worm wheels 16, 17. According to Figures 4 and 6 the worm wheel 17 is keyed on a hub 18a mounted on a cylindrical clutch housing 18. At the opposite side the housing 18 is open and is provided with internal screwthreading into which a cover 19 is fixedly screwed. The latter is at the same time constructed as one half of a slipping clutch and is provided at the inside with helical teeth 20 which engage with corresponding helical teeth 20 on a clutch half 21 which is arranged in the housing 18 in such manner as to be axially displaceable with respect to the first half. The clutch half 21 is under the influence of a clutch spring 22 which is arranged in the housing 18 and bears at the other end against the bottom of the housing. This spring is a compression coil spring which has been pre-tensioned to a pre-determined value. The clutch half 21 is longitudinally displaceable on a hollow shaft 23 on which the hub 18a is so mounted as to be freely rotatable. The hollow shaft 23 is in turn mounted in a bearing 41 which is arranged displaceably in a corresponding part of the housing 2 so as to be displaceable in the transverse direction in a manner which will be indicated hereinafter. The hollow shaft 23 is secured against axial displacement in the one direction by an adjusting ring 24 which bears against the cover 19. Longitudinally displaceable in the hollow shaft 23 is a control rod 37 to which the displaceable clutch half 21 is fixed by means of a transverse pin 25 which extends through a boss-like extension of the clutch half 21, the said pin being guided through two slots 26 in the hollow shaft 23 which are situated diametrically opposite one another. At the opposite end portion the hollow shaft 23 comprises a further slot 39. The axes of the slots 26 and 39 extend in the axial direction of the hollow shaft. Guided through the slot 39 is a transverse pin 38 which is mounted in a suitable transverse hole in the control rod 37 and is guided outside the slot 39 by a further slot 40 extending through the sleeve 27 of a control coupling. The sleeve 27 is mounted on the hollow shaft 23 so as to be longitudinally displaceable but prevented from rotation by a sliding key 28 and comprises functions as a movable clutch half having on its inner end face dogs 29 which co-operate with dogs 30 of a non-displaceable clutch half which is constructed as a tensioning wheel 31. The tensioning wheel 31 is rotatably mounted on the hollow shaft 23 by means of a bushing 33 and is secured against longitudinal displacement on the one hand by a flange 42 of the bearing 41 and on the other hand by a collar on the hollow shaft 23. It is provided over the whole of its periphery with pointed teeth 32 which are interrupted in the middle by an annular groove which is milled out from the wheel 31. At the side facing the flange 42 the wheel 31 is provided with a hub on which is mounted a locking wheel 34 which is connected to the hub by means of pins 35. Engaging with the teeth 36 is a pawl 70 which, as shown in Figures 1 and 4, is pivotally mounted in the housing 2 by means of a bearing pin which is secured into the housing 2 and is formed by a screw 69, and the said pawl is held positively in engagement with the teeth 34 by means of a spring 71. As is shown in Figure 1, a plate-shaped abutment 100 is fixedly arranged on the bed plate 1 under the tensioning wheel 31 and is provided at its upper side with pointed corrugations which, like the teeth 32, extend parallel to the axis of the tensioning wheel. The bearing 41, which is secured against axial displacement in the housing 2 by the flanges 42 provided at both ends, see Figures 4 and 6, is mounted in a bearing 43 which is shown in Figure 7, so as to be displaceable in the direction towards the abutment 100 i.e. in the vertical direction. It comprises at the upper end a central cylindrical recess in which an annular disc 44 is rotatably mounted. The latter is mounted on the lower end of the spindle 5 and is secured by a cover disc 45 against axial displacement with respect to the bearing 41, the said cover disc being fixed to the body of the bearing 41 by screws which are not shown and is provided with a hole for the passage of the spindle 5 which is mounted also in the general bearing 46 arranged on the gear casing 6. Fixed to the upper end of the shaft 5 is a hand wheel 47. By turning the hand wheel 47 the spindle and therefore the tensioning wheel 31 can be adjusted to various heights, at which it is secured in self-locking manner by means of the screwthreading.

The worm wheel 16 is mounted, as shown in Figure 4, on a shaft 48 which is parallel to the hollow shaft 23 and is mounted by means of a bearing bush 56 in the same part of the housing 2. The bush 56 is fixedly secured in this housing part. The wheel 16 bears on the one hand against the bush 56 and on the other hand against an adjusting ring 49 mounted on the shaft 48. At the opposite side of the bush 56, an eccentric disc 54 is freely rotatable on the shaft 48 and secured against longitudinal displacement by a collar 57 of the said shaft. It comprises a toothed segment 57 which extends over part of the periphery as shown in Figure 12a. At the side remote from the bush 56 the eccentric disc 54 comprises dogs 53 with which there cooperate corresponding dogs 52, which are mounted on a clutch coupling sleeve 50. The latter is mounted on the shaft 48 in such manner as to be fast against rotation thereon but longitudinally displaceable by means of a sliding key 51, and is secured against being pulled off by a disc 55, which is fixed by a central screw to the shaft 48.

According to Figures 9 and 10, the toothed segment 57 of the eccentric disc 54 co-operates with a small toothed wheel 59 which is mounted on the rotatable part of a switch 58 for the motor current, said rotatable part comprising a switch knob C for hand operation. This switch is fixed to the housing 2 as shown in Figure 11 and, as shown in Figure 11, comprises a switching element 58a which co-operates with corresponding fixed contacts for switching the motor current on and off.

Also fixed to the housing 2 is a box-like casing 60 which forms a vertical guideway for a closing plunger 62. This is provided at each side with pins 63 which each project through a slot 64 in the housing 60. Engaging one each on the free ends of the pins 63 are restoring tension spring 65 whose other ends are fastened to pins 66. The pins 66 project from the housing 2 in which they are fixed. The housing according to Figure 9 is provided at the underside with a recess 61 for guiding a closing sleeve which is to be inserted into said housing. Located under the said sleeve is a matrix 67 which is fitted into the bed plate 1 and fixed therein, and with which a matching stamping cam 68 mounted on the lower end of the plunger 62 co-operates. The stamping cam 68 is adapted to the particular type of closure chosen for the band, depending on whether the machine is intended to operate with or without closure sleeves.

According to Figures 1 and 2, there is fixed to the housing 2 a bearing fork 72 between whose arms 73 an upright hand lever 75 is articulated by means of a bearing pin. According to Figure 1 the lower end of the hand lever 75 is provided with semi-circular fork legs which half surround the sleeve 27 and are each provided at the end portions with a concentric pin 76. The pins 76 engage into an annular groove 77 which is milled in the middle part of the sleeve 27, so that by swinging the hand lever 75, the sleeve can be axially displaced on the hollow shaft 23 and the dogs 29 can be brought into engagement with the dogs 30.

A further bearing fork 78 is fixed similarly on the housing 2, and between its fork legs 79 a further hand lever 81 is pivotally mounted by means of bearing pin 80, said lever 81 being likewise provided with semi-circular fork legs in which are mounted co-axial entrainment pins 82 which face one another and which engage in an annular groove 95 milled from the clutch coupling sleeve 50. Therefore, by rocking the hand lever 81, the clutch coupling sleeve 50 can be axially displaced on the shaft 48, so that the dogs 52 of the said sleeve can be brought into engagement with the dogs 53 of the eccentric disc 54.

As shown in Figures 1–3, a holder with a terminally spherical handle 97 is fixed to each side of the housing 2. By gripping these two handles, the operator can bring the machine into the position of use, mounting the machine with its bed plate 1 on the pack which is to be dealt with, in the manner shown in Figure 1 for the pack 99, only the upper side of which is illustrated. The steel band which is provided is then laid about the pack 99, forming the usual loop onto which may be fitted a closure element which comes to bear against the loop ends engaging over one another. The steel band together with the sleeve is then pushed forward from the front into the machine so that it comes to lie centrally under the tensioning wheel 31 and the plunger housing 60. In order to tension the band, the spindle 5 and with it the hollow shaft 23 together with all the parts arranged on the said shaft are moved downwards first of all by turning the hand wheel 47, the bearing 41 sliding in the aforesaid vertical guide 43. The tensioning wheel 31 then comes into engagement with the steel band and clamps the band fast with respect to the corrugated abutment 100. During this downward movement the worm wheel 17 rolls on the worm 15 (Figure 7). The motor 7 is then switched on by turning the switch button S in the direction of the arrow shown in Figure 9, and thus the motor is started up if it has not already been brought into operation before. The motor, by way of the worm 12, the worm wheel 10, the worm 10, the worm 15, rotates the worm wheels 16 and 17 in opposite directions as illustrated by the directions of the arrows shown in Figure 7. The clutch housing 18 with the clutch half 19 participates in the rotation of the worm wheel 17. Due to the fact that the clutch half 21 is pressed against the clutch half 19 by means of the spring 22, the clutch half 21 participates in the movement and entrains along with it, by means of the transverse pin 25, the hollow shaft 23 and the control rod 37. By means of the transverse pin 38 the rotary movement of rod 37 is transmitted to the sleeve 27, which is keyed by pin 38 to the shaft 23 and rod 37 in this instance, so that sleeve 27 rotates in the direction of the arrow shown in Figure 1 for the tensioning wheel 31. Then the operator, gripping the handle, swings the lever 75 in the direction of the arrow indicated in Figure 2, which has the result that the sleeve 27 is shifted correspondingly and consequently the dog clutch is engaged so that the dogs 29 and 30 come into engagement with one another. By this means the tensioning wheel 31 is rigidly connected to the sleeve 27 (Figure 5). The transverse pin 38 of the control rod 37 which up to this time was bearing against that flange $a$ of the sleeve 27 which bounds the slot 40 as shown in Figure 4, now bears against the opposite flange $b$ as shown in Figure 5. Since the lower loop end E (Figure 1) of the steel band bears against the corrugated abutment 100 and on the other hand the upper loop end is pressed by the pressure of the teeth of the tensioning 31 against the lower loop end E, the rotation of the tensioning wheel in the direction of the arrow shown in Figure 1 causes the upper loop end, which is entrained by the tensioning wheel, to be pushed away correspondingly with respect to the loop end E which is held fast by the abutment 100. By this means the loop is drawn tightly about the pack 99 with a tension which increases according to the resistance of the pack. Increasing band tension requires a corresponding increase in the driving moment which is to be transmitted to the clamping wheel, transmission being effected by way of the slipping clutch 19, 21. However this clutch has only a limited force-transmitting capacity, which is determined by the pre-tensioning of the spring 22 and the height of the teeth 20. If the torque exceeds this value, the teeth of the clutch half 19 slide over the teeth of the clutch half 21. Owing to the oblique tooth profiles the result is that the clutch half 21 is pushed positively downwards, namely by an amount corresponding to the height of the teeth. By means of the transverse pin 24 it entrains the control rod 37 along with it. The transverse pin 38 bears against the flank $b$ of the sleeve 27 and carries this sleeve along with it, and therefore brings the dogs 29 out of engagement once more with the dogs 30 (Figure 6). In this condition the transverse pin 38 bears against the lower limit of the slot 39. Consequently, the clutch coupling sleeve 27, together with the hollow shaft and the control rod, runs idly, and this has the result that the coupling spring 22 brings the coupling half 21 once more into the position shown in Figure 4 with the teeth 20 engaged. The tensioning wheel 31, left to itself, retains its position since it is arrested by the pawl 70 which engages in the teeth 36 of the ratchet wheel 34. Consequently the band remains tensioned to the same degree.

The machine then runs idly since the second control clutch with the dogs 52, 53 runs idly and consequently the worm 15 drives idly, the worm wheel 16 and thereby the shaft 48 and the sleeve 50. Consequently the operator can then check the band tension which he has produced and ascertain whether it comes up to requirements. If this is not the case and if a greater band tension is required, the operator can provide the slipping clutch with a correspondingly higher spring tension, either by interchanging the clutch springs 22 or by increasing the pre-tension of these springs if means are provided for this purpose. Although such means are not provided in the case of the embodiment which has been explained, means of this find which can be used in the present case will be discussed later hereinafter by way of example.

As soon as the operator has set the desired band tension in this way by modifying the spring tension one or more times and subsequently re-engaging the sleeve 27 by means of the hand lever 75, he puts his hand on the handle of the lever 81 whilst the machine is once more running idly and moves the said lever also in the direction of the arrow which is indicated in Figure 2 for the lever 75, which results in a corresponding axial movement of the sleeve 50 on the shaft 48 and therefore in the engagement of this control clutch by the interengagement of the dogs 52 with the dogs 53. The result is that the eccentric disc 54 is coupled to the sleeve 50 and thereby to the motor drive. The eccentric disc 54 turns in the direction of rotation indicated in Figures 1, 9 and 11 for the shaft 48. During this operation the influence of the eccentric disc 54 causes the plunger 62 to be shifted downwards and the stamping nose 68 deforms the middle part of the superjacent loop ends into the desired closure form, together with the closure sleeve which is pushed over these ends if such a sleeve has been inserted in the guide 61. After the movement of the plunger has been completed, the toothed segment 57 of the eccentric disc 54 comes into engagement with the small toothed wheel 59 and thereby brings the switching element 58a into the transverse position which is illustrated in Figure 11 and in which it is out of contact with the fixed switch contacts, in contrast to the previous vertical position. As a result, the motor current is interrupted at the switch S and therefore the motor is stopped. The peripheral length of the toothed segment 57 is so dimensioned that its teeth come out of engagement with the small toothed wheel 59 as soon as the switching element 58 is in the middle position between the fixed contacts as illustrated in Figure 11. This position is advantageously secured positively by a snap closure as currently used in switches. The operator then grasps the hand lever 81 once again and disengages the dog clutch 29, 30. The plunger 62 is brought back automatically by the restoring spring 65 into the starting position shown in Figure 11 after release by the eccentric disc 54 or by appropriate further rotation thereof, and thus the stamping nose 68 is brought out of engagement with the loop ends.

Then, by turning back the hand wheel 47, the spindle 5 together with the bearing 41 and the hollow shaft 23 and all the parts mounted on the said shaft are brought upwards into the starting position and thus the tensioning wheel 31 releases the band loop. The operator then grasps the handles 97 again and lifts the machine away from the pack, the machine being pulled away from the band loop by an easy movement to and fro, first of all to the rear and then lifted. The surplus part of the upper end portion of the loop, which as a rule is located on a rolled steel band, is now severed by breaking or cutting at the closure sleeve which surrounds the loop ends, or, if no closure sleeve is provided, at the corresponding part of the band. The band can be broken by bending to and fro sharply several times. If a cutting knife is provided, a machine with a built-in cutting apparatus is used, a cutting blade being moved mechanically downwards, this movement being advantageously controlled by the plunger 62, so that the band is severed simultaneously with the formation of the band closure by the stamping nose 68.

The embodiment shown in Figures 13 and 14 differs from the embodiment described hereinbefore only in that instead of the slipping clutch provided according to Figures 4 to 6, slipping of which automatically disengages the tensioning means, there is now provided a slipping clutch in the form of a mere friction clutch, and therefore the control clutch for the clamping device must be disengaged independently of the slipping clutch and by hand as soon as the slip of the slipping clutch shows that the tension of the band loop determined by the clutch spring has been reached.

According to Figures 13 and 14, a clutch sleeve 86 which is fixed to the shaft 85 is arranged in a cylindrical clutch housing 83 which is connected rigidly to the worm wheel 17 and which is freely rotatable on the shaft 85 mounted directly in the bearing 41. The wall of the housing 83 is provided with four elongated slots 84 and the sleeve 86 is provided at its exterior with four longitudinal slots 88. Situated in the annular space between the sleeve 86 and the wall of the housing 83 is a bundle of laminations or discs which consists alternately of discs 90 which are designated as the outer discs and which comprise four projections 91 engaging in the longitudinal slots 84 and of discs which are designated as the inner discs 92 which comprise inwardly projecting projections 93 engaging in the longitudinal slots 88, and also of the friction ring 94 situated between the outer and inner discs. The said ring is provided with a friction lining. The bottommost disc bears against the flange of the clutch sleeve whereas the topmost disc is under the influence of a clutch spring which is constructed as a compression coil spring and which bears at its other end against a nut 87 secured by a lock nut, and screwed on to corresponding threading on the clutch sleeve 86. The tension of the spring 96 can be varied by loosening or tightening the nut further and securing it again by means of the lock nut.

The bushing 33 disposed in the tensioning wheel 31, is directly mounted in rotatable fashion on the other end of the shaft 85, and the said bushing is secured against longitudinal displacement at one end by the bearing flange 42 and at the other end by a collar provided on the shaft 85. The clutch coupling sleeve is mounted on the shaft 85 directly by means of the slide spring 28 so as to be fast against rotation but longitudinally displaceable, and is again in engagement, in a manner which is not illustrated, with the entrainment pins 76 of the coupling lever 75.

Operation proceeds in the same manner as in the case of the embodiment which was at first described, the sleeve 27 being first engaged by operating the hand lever 75 and thus the dogs 29 are made to engage with the dogs 30. Owing to the frictional power under the pressure of the spring 96 the housing 83 is connected in a frictionally locking manner to the clutch coupling sleeve 86, so that the motor drive of the worm wheel 17 is transmitted to the shaft 95 until the torque to be transmitted to the tensioning wheel 31 has become so great that the discs in the slipping clutch begin to slip with respect to one another. This step is visibly obvious to the operator, who sees that the tensioning wheel 31 is stopped and, by operating the hand lever 75, he changes the sleeve 27 back to the starting position, disengaging the dogs 29 from the dogs 30.

If owing to insufficient tension of the band loop, subsequent tensioning is necessary, the clutch spring 96 is tensioned more tightly accordingly and hand lever 75 is again engaged, which, in accordance with the increased frictional pressure, results in the shaft 85 being once more entrained by the slipping clutch, until the clutch again slips when an appropriately higher torque is reached, whereupon the operator again disengages the dog clutch by means of the lever 75.

The embodiment shown in Figure 15 differs from that according to Figures 1 to 12 only as regards the part illustrated in Figure 5. As will be seen by comparing this with Figure 15, the clutch coupling sleeve together with the transverse pin 38 and the slot 40 are dispensed with, including the dogs 30 on the tensioning wheel 31. Instead, the tensioning wheel 31 according to Figure 15 is fixed directly to the hollow shaft 23 by means of a key 150 so as to be non-rotatable and non-displaceable on the said shaft. The control rod 37 comprises a slot 151 which is limited at the side towards the end of the rod by a flank d which is directed somewhat obliquely with respect to the transverse direction. Guided through the slot 151 is a pin 152 whose head is displaceably mounted in non-rotatable fashion in a slot 153 of the hollow shaft 23 so as to be capable of displacement in the longitudinal direction of the pin. The pin has a cylindrical shank 154 which is longitudinally displaceable in an appropriate hole in the hollow shaft 23 and which is provided at its end lying outside the hollow shaft with screwthreading, on which a threaded cap 155 can be adjusted and fixed in various positions by means which are not shown in the drawings. Arranged between the threaded cap 155 and the hollow shaft 23 is an adjusting spring 156 which is constructed as a compression coil spring surrounding the shank 154 of the pin. The shank 154 is provided at the head end with a nose 157 directed towards the hollow shaft end and the said nose is located within the slot and is limited by a wedge surface $e$ parallel to the flank $d$. The nose 157 projects beyond the flank $d$ by an amount $f$ which is slightly less than the height of the teeth 20 of the slipping clutch halves 19, 21 (Figures 4 and 6). In contrast to Figures 4 and 6, the clutch spring 22 is supported on a collar of the hollow shaft 23 instead of on the housing 18.

In the starting position, with the tensioning wheel 31 not loaded, the slipping clutch as illustrated in Figure 4 is engaged. The control rod 37 is in the starting position shown in Figure 15 with respect to the hollow shaft 23. Then if, during the tensioning operation, the motor drive by way of the worm wheel 17 and the slipping clutch transmits a torque to the hollow shaft 23 and thence by means of the key 150 directly to the tensioning wheel 31, the pin 152 does not participate in this operation. As soon as the torque has increased owing to the tensioning resistance to such an extent that the clutch half 21 begins to slip with respect to the half 19, and therefore the control rod 37 is displaced in the direction of the arrow shown in Figure 15, then the value $f$ is reduced accordingly. As soon as this has dropped to zero, the surface $e$ of the nose 157 comes into contact with the flank $d$ of the slot 151 and is then pushed, by means of the suitably pre-tensioned adjusting spring 156, along the flank $d$ into the slot 151, the pin head sliding inwards in the slot 153. Owing to the slight taper of the flank $d$ and of the surface $e$, the rod 37 is displaced further by a slight amount in the direction of the arrow, and the result is that the teeth of the clutch half 21 become completely disengaged from the teeth of the clutch half 19. Consequently the slipping clutch is completely disengaged, so that the slipping clutch half 21 together with the hollow shaft 23 and the control rod 37 and the tensioning wheel 31 are stopped, the latter being again prevented from turning back by the pawl 70. The state of tension of the steel band can now be checked. If the band is insufficiently tensioned, the tensioning force of the clutch spring 22 is again increased in the aforementioned manner. The slipping clutch is then again engaged, the operator applying pressure in the direction of the arrow shown in Figure 15 on the threaded cap 155, and this pressure overcomes the force of the adjusting spring 155 and returns the pin once more to the starting position shown in Figure 15. The force required for this purpose is reduced by the aforementioned taper of the flank $d$ or surface $e$, since the clutch spring 22 acts in the sense of displacing the pin in this direction by a wedge effect. As soon as the pin 152 again reaches the starting position according to Figure 15, this nose 157 releases the control rod 37, with the result that the clutch spring 22 again engages the slipping clutch. The clutch is now again capable of transmitting the increased torque, so that the band can be subsequently tensioned to the appropriate degree, after which the slipping clutch is again disengaged automatically.

Instead of the pin 152, it is also possible to arrange another control element, perhaps at another part of the slipping clutch if so desired, in such manner that due to the slipping of the clutch the said element disengages the clutch automatically until it is again engaged by actuating the control element in the reverse sense. In this case the slipping clutch can also be constructed different from what is illustrated in the drawings. For example, it is possible to use a clutch operating with elastic snap-action elements, or another of the known slipping clutches.

In the case of the wire tensioning machine shown in Figure 16 to 19, the hollow shaft 23 is rotatably but non-displaceably mounted in a bearing bush 101 in the housing 2 (Figure 18), in contrast to the band tensioning machines as hereinbefore. Moreover instead of the band tensioning wheel, a wire tensioning wheel 102 is mounted on the hollow shaft 23, again by means of a bushing 33 which carries the dogs 30. The tensioning wheel 102 is provided with radial holes 103 for insertion of the wire end.

The slipping clutch differs from that of the embodiment of Figures 4 to 6 merely in that it comprises means for arbitrarily modifying the pre-tension of the clutch spring 22. To this end, the spring 22 according to Figure 18 bears, at the side opposite the clutch half 21, against the spring cap 137 which is axially displaceable in the housing 18, and which is provided externally with radial support arms 138. These each extend through an elongated slot 139 in the wall of the housing 18 and are supported outside the housing on an adjusting nut 140, which is adjustably screwed on to the externally threaded housing wall. By turning the nut 140 in one or other direction, the spring cap 137 can be axially adjusted correspondingly, and the pre-tension of the spring 22 varied.

In contradistinction to the embodiment shown in Figure 4, in the embodiment shown in Figures 16 to 19 the closure device comprises, instead of the eccentric disc 54, a bevel-gear wheel 104 which is freely rotatable on the shaft 48 and which comprises a bearing bush 135. The bevel-gear wheel 104 meshes with a bevel-gear wheel 105 which is keyed by a key 106 to an intermediate shaft 107. The shaft 107 is rotatably but axially non-displaceably mounted by means of a bearing bush 108 in a bearing 109. The bearing 109 is rigidly screwed to the bed plate 1. Fixed by means of a key 111 on the boss of the bevel-gear wheel 105 is a toothed wheel 110 which comprises, at the side facing the bearing 109, a cup 134 into which there projects a locking pin 136 which is mounted for longitudinal displacement in an axial bore of the bearing 109 and is under the influence of an adjusting spring 133 which is located in said bore and is constructed as a compression coil spring, said spring urging said pin positively into the cup 134.

According to Figure 16, the toothed wheel 110 meshes with a twisting pinion 112, which is provided with a slot 128 open at the front. The pinion 112 is rotatably mounted with one end in each of two bearings 113 and 114. These bearings are likewise provided each with a forwardly open slot and fixed to the bed plate 1. Secured on the bed plate 1 at a distance from the bearing 114 and coaxially therewith is a wire guide element 115, whilst a guide element 116 is similarly secured on the bed plate 1 at the other side at a distance from the bearing 113. At the sides of the guide elements 115 and 116 remote from the pinion 112 there are mounted respectively the knife levers 117 and 118, and the latter cooperate with the said guide elements and are pivotally arranged on bearing pins as shown by the pin 119 for the lever 117 in Figure 17. The knife lever 117 has a knife edge 158 which is so arranged that, when the lever 117 is rocked in the counter-clockwise direction, the two steel wires 159 and 160 respectively situated close together in the slot of the guide element 115 according to Figure 17, the said knife edge can seize only that wire which is furthest removed from the bearing pin 119, so that only this wire is severed whilst the other remains uninjured.

The knife lever 118 is similarly constructed and arranged in relation to the guide element 116.

Also arranged on the bed plate 1, at a distance from the knife 117, is a wire clamp 120 having a clamping slot through which the wire 160 is guided and clamped fast. This wire can come from a roll of wire and is guided through the wire clamp through the pinion bearings 114, 113, the pinion 112 and the wire guide element 116 and then about the pack which is to be tied and upon which the machine has been positioned resting on its bed plate 1. The free wire end 159 is threaded first through the wire guide element 116 and then followed by the wire end 160 coming from the roll. The wire end 159 is then likewise threaded through the bearings 114, 113, the twisting pinion 112, and pushed up to the wire end 160 in the guide element 116. Thus the only wire end which lies in the path of the knife edge 158 of the knife lever 118, as compared with the knife lever 117, is the free wire end 159, whilst the end 160 lies outside the cutting range of the knife lever 118. As is illustrated in Figure 16, the free wire end is pushed into one of the holes 103 of the tensioning wheel 102 after being bent over sharply through 90°, so that when the tensioning wheel 102 is turned in the direction indicated in Figure 16, the wire end 159 is carried along with it.

Provided for driving the cutting mechanism comprising the knife levers 117 and 118 is a control arm 127 which, as is shown in Figure 17, is mounted on the intermediate shaft 107 and co-operates with a driving lever 123, which is mounted on a control shaft 121 and whose end portion co-operates with the knife lever 117. At its other end, the control lever 121 comprises an analogous driving lever 124, in whose path the knife lever 118 lies. Also mounted on the shaft 121 is an upwardly directed control arm 122 which co-operates with a switch button 130 for the motor current. The control shaft is rotatable parallel to the intermediate shaft in bearings 125 and 126, but mounted on the housing 2 so as to be incapable of longitudinal displacement. Arranged near the switch button 130 on the motor housing is a hand-operated motor control switch button 129.

Also mounted on the control shaft 121 is a control arm 131 which faces the hand lever 81 and co-operates therewith.

In order to use the wire closing or locking machine which has been described, the machine is first mounted on the pack in the manner which has already been explained, and the steel wire is looped about the pack. Then first of all the switch button 129 is pressed inwards to set the motor in operation and, by taking hold of the hand lever 75 again as in the case of the first embodiment the dog clutch 29, 30 is engaged, with the result that the tensioning wheel 102 is rotated in the direction of the arrow shown in Figure 16. In this operation the wire end 159 is wound on to the tensioning wheel 102, while on the other hand the other wire end is held fast by clamping the wire 160 in the clamping device 120, so that the loop is tightened. As in the case of band tensioning, the loop tension is limited by the set force-transmitting ability of the slipping clutch 19, 21, and the slipping of this clutch again disengages the dog clutch 29, 30 automatically and the machine runs idly. Then, if so desired, the wire can be subsequently tensioned. As soon as the correct wire tension has been reached, the dog clutch 52, 53 is again engaged by operating the other hand lever 81, whereby the shaft 48 drives the toothed wheels 104, 105, the toothed wheel 110 and the twisting pinion 112, together with the intermediate shaft 107. The latter rotates in the direction of the arrow shown in Figure 17. The pinion 112 twists together the wires 159 and 160 which have been inserted in the slot 128. After the twisting operation is complete, the control arm 127 of the shaft 107 comes into the region of the driving lever 123 (Figure 17). The result is that the lever 123 is rocked and entrains the knife lever 117, whilst there is a simultaneous corresponding rotation of the control shaft 121, which operates the driving lever 124 synchronously with the lever 123 and thereby also actuates the knife lever 118, whereby the loop ends are cut off at the wires 160 and 159 respectively. The control arm 131 which participated in the rotation of the control shaft 121, then comes into contact with the lever arm 81a of the hand lever 81 and rocks the hand lever 81 in the clockwise direction about its bearing pin 80 according to Figure 17, and this results in a corresponding axial displacement of the clutch coupling sleeve 50 and consequently in disengagement of the dog clutch 52, 53. The drive of the bevel-gear wheel 104 is thereby interrupted.

The control arm 122 then comes into engagement with the switch button 130 and switches off the motor current, whereby the whole machine is stopped. In order to return the moved parts of the cutting means, the knife lever 117 has articulated thereto, as shown in Figure 17, a restoring spring 132 whose other end is engaged on the bearing 109. The knife lever 118 is under the influence of a restoring spring in similar manner. As can be seen from Figure 17, the driving lever 123 is provided with a bend c at the side facing the control arm 127. The control arm 127 is so arranged that when it rotates in the direction of the arrow, it has passed the bend c when the motor is switched off, so that the restoring springs 132 return to the initial position the knife levers and at the same time the driving levers 123, 124, the control shaft 121 and all the control arms mounted thereon.

The locking pin 136 arranged in the bearing 109 is so arranged and the cup 134 so offset in the peripheral sense in the toothed wheel 110 that, after the twisting device is uncoupled by the dog clutch 52, 53, the pin 136 provides means for centering the twisting wheel 110 accurately so that the slot 128 of the twisting pinion 112 faces the front, as is necessary for inserting the steel wires before they are twisted and for extracting same after they have been twisted. Of course, instead of this centering means it would also be possible to use another per se known centering means e.g. spring pawls of known type. The machine can then be pulled off backwards by hand, the wire loop being withdrawn from the twisting pinion 112, the bearings 113, 114 and the guide elements 115, 116.

The constructional form according to Figures 20 and 21 differs from the preceding constructional form merely in that a bearing arm 141, whose free end comprises a fork, is secured to the gear casing 6. A two-armed control lever 143 is mounted in the said fork by means of a bearing pin 142. Said control lever is articulated at each end, releasably at one end, to one of the two hand levers 75, 81 respectively. For this purpose both the control lever 75 and also the control lever 81 are provided with a hole which carries a pin 144 in the case of the control lever 75 and 145 in the case of the control lever 81, and the other end of each pin being inserted in an appropriate hole in the lever 143. Both pins are preferably inserted in the said lever in such manner as to capable of being withdrawn therefrom. The control clutch halves 29, 52 are coupled in opposed relationship to one another by means of this control lever, i.e. when, in order to start the machine operating, the dog clutch 29, 30 is engaged by operating the lever 75 by hand, the control lever 143 actuates the hand lever 81 positively in the sense of disengagement of the dog clutch 52, 53. Vice versa, after the tensioning operation is concluded, as soon as the dog clutch 29, 30 is automatically disengaged and therefore the clutch coupling sleeve 27 is disengaged in the sense of the arrow 146 (Figure 21), then the control sleeve 50 of the other dog clutch is positively engaged in the direction of the arrow 147 and the closing operation initiated thereby.

In this condition the machine is employed for series packing work, when the requisite tension of wire loop is fixed once for all for a whole series of packs. However, if it is desired to change over to another series, in which the requisite tensioning force must first be tested, then one of the pins 144, 145, or if necessary both these pins, is withdrawn from the control lever 143 and the relevant hole in the hand lever. This eliminates the automatic contrary-sense connection of the dog clutches. Then, if necessary, subsequent tensioning can be carried out by changing one or more times the tension of the slipping clutch spring, until a suitable wire tension has been found, whereupon the pin or pins 144 or 145 can be re-inserted in position so as to re-establish the arrangement for automatically engaging and disengaging the dog clutches.

Of course this or a similarly operating automatic apparatus can also be used in the case of the analogous embodiment of a band tensioning machine such as was described e.g. with reference to Figures 1 to 12 hereinbefore.

The same applies analogously to the severing mechanism which was described with reference to the embodiment shown in Figures 16 to 19.

It is advantageous to combine with the means for varying the pre-tension of the clutch spring 22 as described with reference to Figure 18, an indicating device for allowing the particularly pre-tension force of the clutch spring to be ascertained at any time. To this end, one of the radial support arms 138 of the spring cap 137 can be provided with a pointer marking which cooperates with a scale provided on the wall of the clutch housing 18. The scale can indicate the particular pre-tension of the clutch spring indirectly, e.g. in kilograms, or alternatively directly, namely with relation to the maximum tractive force capable of being transmitted by the tensioning wheel to the packing wire at the particularly pre-tension of the clutch spring. Thus in this case the device indicates, at each position of the spring cap, the tensioning force which the machine is capable of transmitting to the pack in this condition. This device also can easily be used analogously where a band is being used as a tensioning member instead of a wire.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A clutch control means comprising a slipping clutch and a control clutch, a cylindrical housing, a clutch spring, a first half of said slipping clutch being axially displaced under the influence of said clutch spring and being arranged together with said spring on said cylindrical housing, the other slipping clutch half forming a cover for said cylindrical housing and being mounted so as to be rotatable along with said housing, a spring cup in said housing, said clutch spring being supported on said spring cup and engaging said first half of said slipping clutch, said housing having slots therein, said spring cup being axially displaceable in said housing, said spring cup having support arms projecting through said slots, adjusting nut threaded on said housing, said support arms being supported on said adjusting nut so that threaded adjustment of said adjusting nut adjusts the stress on said clutch spring.

2. A machine for tensioning and closing a loop about a pack comprising a motor, a tensioning device for tightening said loop, a slipping clutch and a control clutch, a cylindrical housing, said tensioning device being driven by said motor through said slipping clutch and said control clutch, a clutch spring, a first half of said slipping clutch being axially displaced under the influence of said clutch spring and being arranged together with said spring in said cylindrical housing, the other slipping clutch half forming a cover for said cylindrical housing and being mounted so as to be rotatable along with said housing, a spring cup in said housing, said clutch spring being supported on said spring cup and engaging said first half of said slipping clutch, said housing having slots therein, said spring cup being axially displaceable in said housing, said spring cup having support arms projecting through said slots, and adjusting nut threaded on said housing, said support arms being supported on said adjusting nut so that threaded adjustment of said adjusting nut adjusts the stress on said clutch spring to adjust the amount of tension said tensioning will apply on a loop.

3. A machine for tensioning a loop applied about a pack comprising a tensioning device for tightening a loop, a slipping clutch for driving said tensioning device, said slipping clutch comprising two concentric displaceable clutch halves provided with cooperating helical teeth, a spring urging one of said clutch halves towards the other of said clutch halves, means engaging said spring for adjusting an initial stress on said spring, a control clutch associated with said slipping clutch and arranged between the slipping clutch and the tensioning device, said control clutch being provided with a fixed clutch half and a displaceable clutch half, said tensioning device being driven by way of said slipping clutch and said control clutch, said other of said clutch halves being mounted in axially displaceable manner and being connected with the displaceable clutch half of said control clutch.

4. A machine according to claim 3, wherein the control clutch halves are formed as dog clutches, and a control element associated with said slipping clutch and said control clutch in such a manner that when said clutch slips said element disengages said clutch until said clutch is re-engaged by the actuation of said control element.

References Cited in the file of this patent
UNITED STATES PATENTS

| | | |
|---|---|---|
| 1,196,349 | Gilbert | Aug. 29, 1916 |
| 1,486,354 | Mueller | Mar. 11, 1924 |
| 1,868,141 | Harvey | July 19, 1932 |
| 1,963,593 | Prindle | June 19, 1934 |
| 1,999,144 | Spoor | Apr. 23, 1935 |
| 2,530,904 | Ofeldt | Nov. 21, 1950 |